United States Patent [19]

Ishizuka et al.

[11] Patent Number: 4,998,798
[45] Date of Patent: Mar. 12, 1991

[54] ENCODER HAVING LONG LENGTH MEASURING STROKE

[75] Inventors: Koh Ishizuka, Urawa; Tetsuharu Nishimura, Kawasaki; Satoshi Ishii, Tokyo; Yoichi Kubota, Kawasaki; Masaaki Tsukiji, Tokyo, all of Japan

[73] Assignee: Canon Kabushiki Kaisha, Tokyo, Japan

[21] Appl. No.: 346,886

[22] Filed: May 3, 1989

[30] Foreign Application Priority Data

May 10, 1988 [JP] Japan .................................. 63-112734

[51] Int. Cl.⁵ .......................... G02B 27/02; G01J 15/00
[52] U.S. Cl. ................................ 350/115; 250/237 G; 356/213; 356/356; 358/324; 358/213.13; 364/526
[58] Field of Search ................................ 350/115, 500; 250/237 G, 231 SE, 271, 555, 556, 557, 578; 356/356, 395, 213; 358/319, 320, 324, 213.13; 364/526

[56] References Cited

U.S. PATENT DOCUMENTS

| | | | |
|---|---|---|---|
| 3,818,198 | 6/1974 | Walker et al. | 364/526 |
| 4,096,384 | 6/1978 | Sartorio et al. | |
| 4,158,509 | 6/1979 | Rieder et al. | |
| 4,602,242 | 7/1986 | Kimura | 250/237 G |
| 4,629,886 | 12/1986 | Akiyama et al. | 250/237 G |
| 4,676,645 | 6/1987 | Taniguchi et al. | 250/237 G |
| 4,785,181 | 11/1988 | Kimizuka et al. | 250/237 G |

FOREIGN PATENT DOCUMENTS 58-191906 3/1983 Japan .

Primary Examiner—Bruce Y. Arnold
Assistant Examiner—Loha Ben
Attorney, Agent, or Firm—Fitzpatrick, Cella, Harper & Scinto

[57] ABSTRACT

An encoder having a long length measuring stroke with a simple construction is provided. The encoder comprises a scale formed with a periodic lattice pattern, first and second reading heads arranged along a moving direction of the scale for reading the scale, and an adder for adding output signals from the first and second reading heads. The encoder further has adjusting mechanism for adjusting such that the phase difference between the output signals from the first and second reading head becomes zero. A continuous periodic signal can be always accurately obtained independently of the position of the scale.

15 Claims, 3 Drawing Sheets

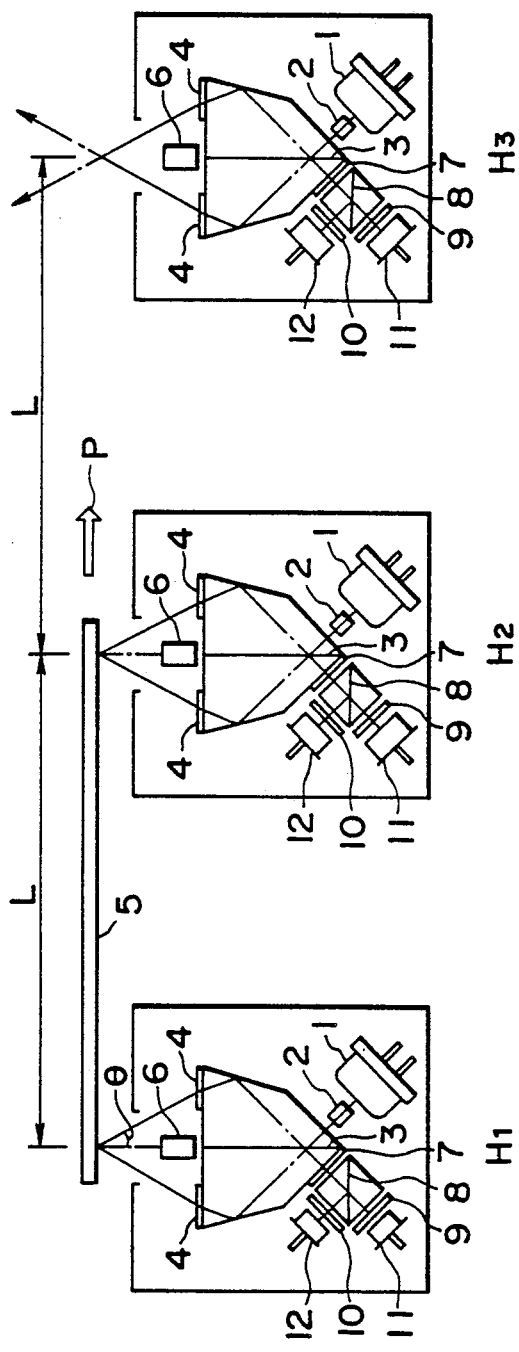
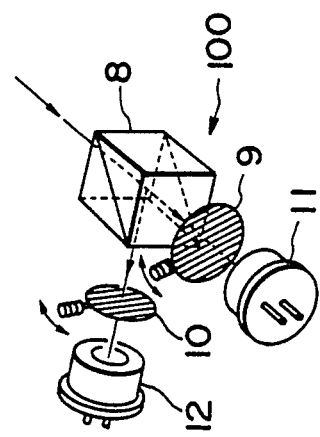
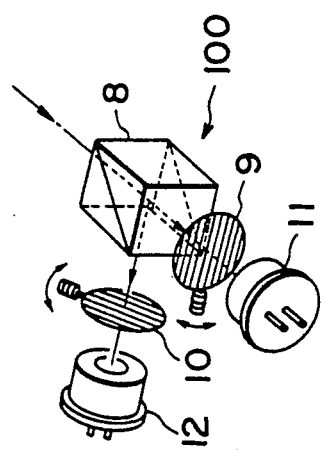
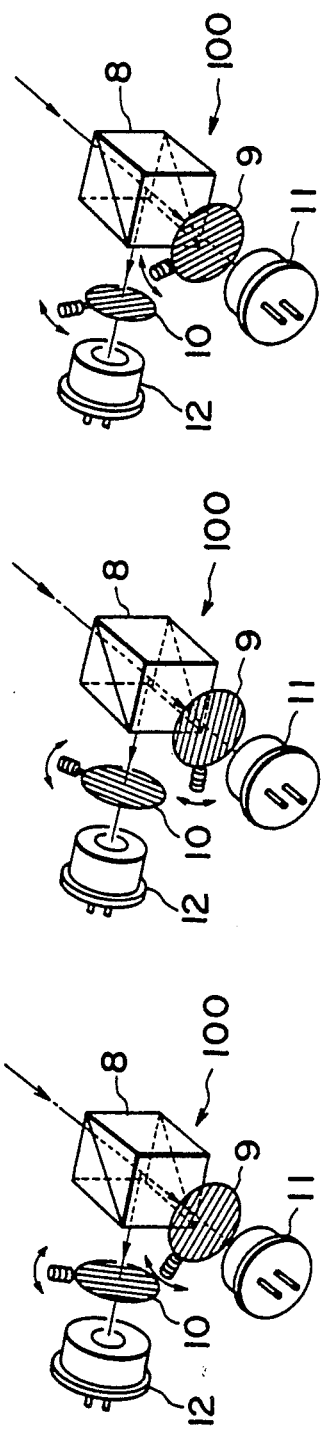
FIG. 1
FIG. 2A    FIG. 2B    FIG. 2C

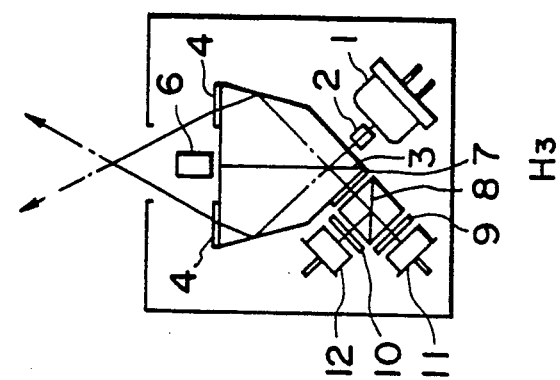
FIG. 4A
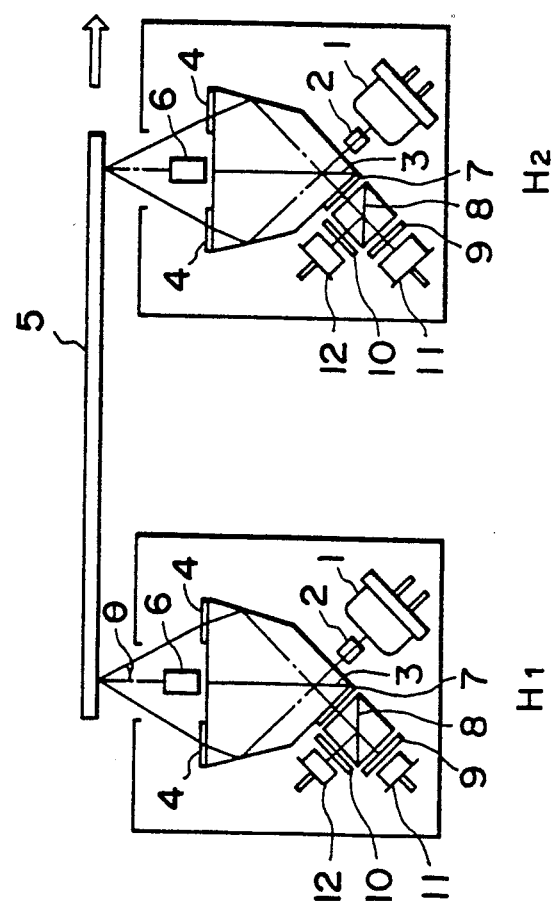
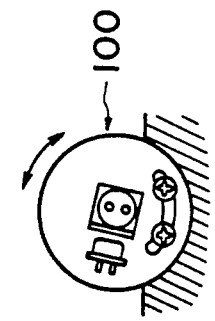
FIG. 4D
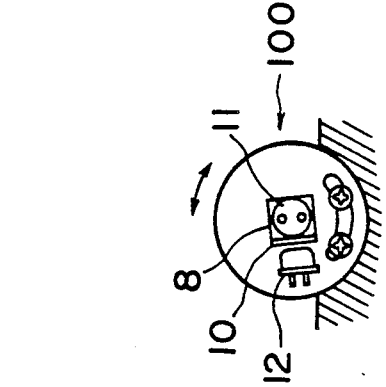
FIG. 4C
FIG. 4B

4,998,798

ENCODER HAVING LONG LENGTH MEASURING STROKE

BACKGROUND OF THE INVENTION

1. Field of the Invention

The present invention relates to an encoder and, more particularly, to an encoder having a long length measuring stroke.

2. Related Background Art

Hitherto, an encoder having a high resolution and a long length measuring stroke has strongly been demanded.

It is sufficient to make the scale long to extend the length measuring stroke. However, it is difficult to make a long scale having a fine lattice pattern.

To avoid such a problem, the applicant of the present invention has proposed an optical type linear encoder having a high resolution and a long length measuring stroke as disclosed in JP-A-58-191906. According to the linear encoder shown in this Official Gazette, a plurality of reading heads are arranged at intervals shorter than the effective length of the lattice pattern portion formed in a scale, and a signal from each of the reading heads is selectively extracted in association with the movement of the scale thereby reading the scale. Such a type of encoder has also been disclosed in U.S. Pat. Nos. 4,158,509 and 4,096,384 and the like.

However, to switch the signals from the reading heads as mentioned above, an additional mechanism such as a sensor to monitor the position of the scale and the like is necessary, so that the construction of the encoder becomes complicated and it is not preferred.

SUMMARY OF THE INVENTION

It is an object of the present invention to provide an encoder in which a length measuring stroke can be made long and the construction is simple in consideration of the conventional problems as mentioned above.

To accomplish the above object, an encoder of the invention comprises: a scale formed with a periodic lattice pattern, first and second reading means, arranged along a moving direction of the scale, for reading the scale, and an adder for adding output signals from the first and second reading means.

Further, the encoder of the invention has adjusting means for adjusting such that the phase difference between the output signals from the first and second reading means becomes zero. Thus, a continuous periodic signal can be always accurately obtained independently of the position of the scale.

A practical construction of the adjusting means is shown in detail in an embodiment, which will be explained hereinbelow. By providing such adjusting means, if the phases of the output signals from the reading means are deviated due to some reason at the time of the setting of the encoder or after the encoder was set, the phases of the output signals from the reading means can be made coincide.

Although the invention can be applied to various types of encoders, for instance, the invention is particularly useful for optical type encoders for measuring the displacement of the scale by using a diffracted light as disclosed in the above-mentioned JP-A-58-191906 applied for by the applicant of the present invention, JP-A-58-101907, JP-A-61-178613, JP-A-62-6119, and U.S. Pat. Nos. 3,726,595, 4,676,645, and 4,629,886.

Such optical type encoders have a high resolution. If they are used as the reading means, an encoder having a long length measuring stroke and a high resolution can be constructed.

According to the encoder, the operation to adjust the phase differences among the output signals of a plurality of reading means so as to become zero is executed by adjusting the attaching rotational angle of the optical device such as a polarising device or the like to form an interference signal instead of adjusting the positions of the reading means, so that the phase differences among the periodic signals which are output from the reading means can be easily corrected. On the other hand as mentioned above, by always adding the signals from the reading means by the summation circuit, even if the optical scale is detected by any one of the reading means or even if the signals are simultaneously obtained from both of two of the reading means, the continuous periodic signal can be obtained over the whole stroke of the scale. Thus, the encoder having the accuracy and length measuring stroke which are equal to those of the linear encoder using the linear scale having a long fine lattice pattern can be realized.

The invention is not limited to the optical type encoder but is also useful for a magnetic type encoder or the like using magnetic heads as the reading means.

The above and other objects and features of the present invention will become apparent from the following detailed description and the appended claims with reference to the accompanying drawings.

BRIEF DESCRIPTION OF THE DRAWINGS

FIG. 1 is a schematic diagram showing a reading head of an encoder according to an embodiment of the present invention;

FIGS. 2A to 2C are explanatory diagrams showing a state to adjust the phases of the signals which are output from the reading heads shown in FIG. 1;

FIGS. 4A to 4D are explanatory diagrams showing another example of a method of adjusting the phases of the signals which are output from the reading heads shown in FIG. 1.

DETAILED DESCRIPTION OF THE PREFERRED EMBODIMENTS

Figure 3:
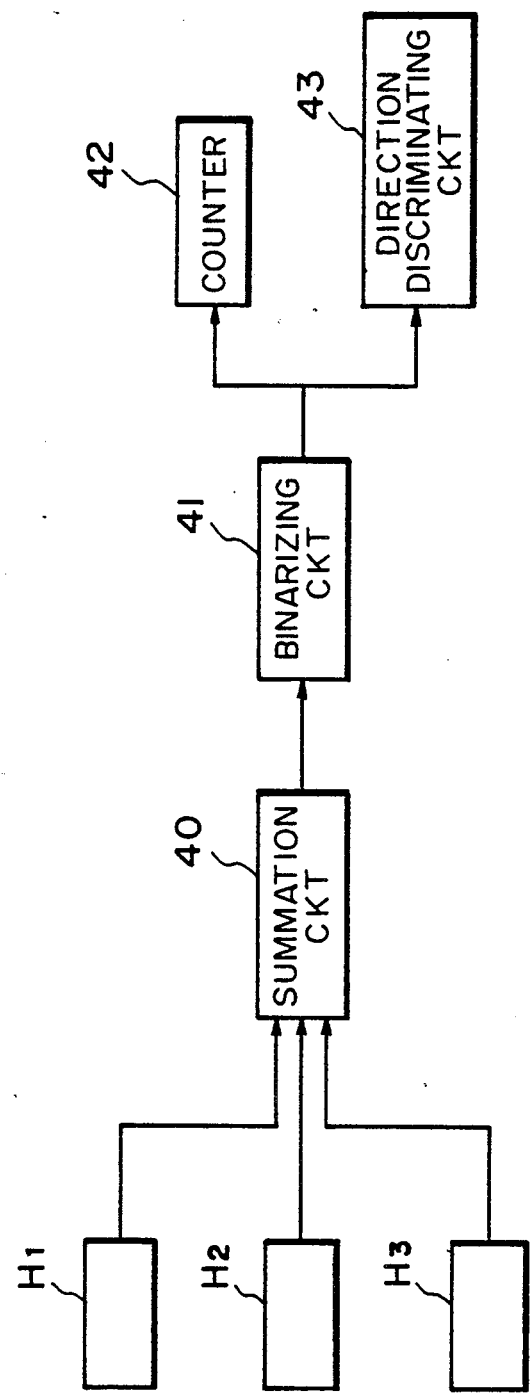
FIG. 3 is a block diagram showing an example of a circuit to process the output signals from the reading heads shown in FIG. 1.

FIGS. 1, 2A to 2C, and 3 show an embodiment of an encoder according to the invention. FIG. 1 shows constructions of reading heads $H_1$ to $H_3$. FIGS. 2A to 2C are enlarged perspective views of photo sensitive sections of the reading heads $H_1$ to $H_3$ and show a state in which the phases of signals which are output from the reading heads $H_1$ to $H_3$ are adjusted. In FIGS. 1 to 2C, reference numeral 1 denotes a semiconductor laser; 2 a collimating lens; 3 a polarizing beam splitter; 4 a quarter wavelength plate; 5 a linear scale on which a diffraction grating pattern is formed; 6 a reflective optical device; 7 a quarter wavelength plate; 8 a non-polarizing beam splitter (half mirror); 9 and 10 polarizing devices such as polarizing plates or the like which are arranged so that the polarizing azimuths are deviated by 45° and which are rotatably attached; and 11 and 12 photo sensitive devices. According to the encoder, the parts other than the linear scale 5 are assembled in one box and such an assembly is called a reading head. Three such reading heads $H_1$, $H_2$, and $H_3$ are prepared and arranged at intervals each of which is not longer than the effective length (which is obtained by subtracting a diameter of light spot irradiated onto the scale 5 from the length of the portion where a lattice pattern is formed) of the lattice pattern portion of the scale 5. As shown in FIG. 1, when the scale 5 is moved from the left side in the diagram to the direction indicated by an arrow P, the signal is first obtained from only the head $H_1$. Subsequently, the signals are output from both heads $H_1$ and $H_2$. Next, the signal is output from only the head $H_2$. Then, the signals are output from both heads $H_2$ and $H_3$. Finally, the signal is output from only the head $H_3$. The signals from the heads $H_1$, $H_2$, and $H_3$ are added by a summation circuit (adder) 40 as shown in FIG. 3. For instance, in response to the movement of the scale 5, the signals from the heads $H_1$ and $H_2$ or the signals from the heads $H_2$ and $H_3$ are added and the added signal is output. Therefore, the photo sensitive devices 11 and 12 of each of the heads $H_1$, $H_2$, and $H_3$ are electrically connected to the summation circuit 40 by signal lines.

An output signal from the summation circuit 40 is input to a binarizing circuit 41 and binarized. The binarized signal is input to a counter 42 and a direction discriminating circuit 43.

In the embodiment, as shown in FIGS. 1 to 2C, the interference lights are received by the photo sensitive devices 11 and 12 through the polarizing plates 9 and 10 whose polarizing azimuths are deviated by 45°. Therefore, the signals whose phases are deviated by 90° can be extracted from the photo sensitive devices 11 and 12. Such a function will be practically explained hereinbelow. Therefore, the signals of two phases are output from each of the heads $H_1$ to $H_3$ and are input to the summation circuit 40. The summation circuit 40 adds the first signals generated from each photo sensitive device 11 among the two-phase signals from each of the heads $H_1$ to $H_3$ and also adds the second signals whose phases are deviated by 90° from those of the first signals and which were generated from each photo sensitive device 12. The reason why such two-phase signals are used is to discriminate the moving direction of the scale 5. The moving direction of the scale 5 can be determined by a well-known method of comparing those signals.

As mentioned above, the two-phase signals (the first and second signals) are input to the summation circuit 40 from each of the heads $H_1$ to $H_3$ and the signals having almost the same phase are added when at least two heads read the scale 5. Therefore, at this time, the added two-phase signal is output from the summation circuit 40. Therefore, the output signal from the summation circuit 40 includes those two-phase signals. These signals are respectively binarized by the binarizing circuit 41. Each of the binarized signals is input to the counter 42 and direction discriminating circuit 43 The counter 42 obtains the displacement amount and displacement speed of the scale 5 by counting the pulses of at least one of the binarized signals On the other hand, the direction discriminating circuit 43 determines the moving direction of the scale 5 by comparing the pulses of both of the binarized signals as mentioned above. When the scale 5 is read by a single head, the amplitude of the two-phase signal which is output from the summation circuit 40 merely becomes small and the subsequent processes are similar to those in the case where the scale is read by a plurality of heads mentioned above.

In the embodiment, the operation to switch the reading process of the scale 5 by the heads $H_1$ to $H_3$ is unnecessary, so that the construction is simplified. Assuming that the interval among the heads $H_1$ to $H_3$ is set to L and the effective length of the scale 5 is set to l, the length measuring stroke of the scale 5 is equal to $2L+2l$, so that this stroke is very much longer than the length of the scale 5. By setting the interval among the heads to a value near the effective length of the scale, the length measuring stroke can be enlarged to the maximum limit value.

In general, if N sets of reading heads are arranged at intervals L, the length measuring stroke is equal to $(N-1)L+2l$, so that the linear encoder using the scale having a long apparent length of $(N-1)L+2l$ is realized.

The reading principle of the scale 5 by each of the heads $H_1$ to $H_3$ is as follows. A laser beam from the semiconductor laser 1 is separated to a P polarizing light and an S polarizing light by the polarizing beam splitter 3. Each light beam is first converted into a circular polarizing light by the quarter wavelength plate 4 and, thereafter, it is directed to a diffractive lattice pattern of the scale 5. The light is then diffracted by the diffraction grating ± primary reflective diffracted light beams such as to cause the phase deviation according to the displacement of the diffraction grating (that is, of the scale 5) are generated from the diffraction grating. The ± primary reflective diffracted light beams are again input to the diffraction grating through the reflective optical device 6, thereby again diffracting them. The ± primary rediffracted light beams pass through the quarter wavelength plate 4 and become the light beams (S polarizing light and P polarizing light) whose polarization planes are shifted by 90° from those of the light beams when they first passed through the quarter wavelength plate 4. These shifted light beams enter the polarizing beam splitter 3. The light beams are overlaid by the beam splitter 3 without a loss of light and enter the quarter wavelength plate 7. The quarter wavelength plate 7 converts the ±primary rediffracted light beams to the circular polarization light beams whose circulating directions are opposite. Therefore, by transmitting the overlaid ± primary diffracted light beams through the quarter wavelength plate 7, they are converted into the linear polarization light beams having polarization planes in the azimuth which is determined by the phase difference of the ±primary rediffracted light beams which were polarized in the vertical directions before they were input to the quarter wavelength plate. The polarization planes of the linear polarized light beams rotate in accordance with the displacement of the scale 5.

The light transmitted through the quarter wavelength plate is divided into light beams having an equal light amount by the non-polarizing beam splitter 8. The light beams are input to the photo sensitive devices 11 and 12 through the polarizing devices 9 and 10. Therefore, when the polarization planes of the light beams which enter the polarizing devices 9 and 10 rotate, the intensities of the light beams which pass through the polarizing devices 9 and 10 and enter the photo sensitive devices 11 and 12 are modulated at a predetermined period. Therefore, periodic signals according to the displacement of the scale 5 are output from the photo sensitive devices 11 and 12. The phases of the signals are determined by the polarizing azimuths of the polarizing devices 9 and 10.

In the embodiment, by use of the reflective optical device 6, the P polarization light is subjected to the + primary diffraction twice and the S polarization light is subjected to the − primary diffraction twice. Thus, the deviation of the phases between both of the P and S polarization light beams is set to $8\pi$ to the displacement of the scale 5 per pitch of the lattice pattern. The polarization plane of the linear polarization light which occurs after passing through the quarter wavelength plate 7 rotates twice in accordance with the displacement. Therefore, the interference light beams (the light beams whose intensities are modulated) which are obtained through the polarizing devices 9 and 10 change their bright and dark states by only four periods in accordance with such a displacement.

A portion 100 in which the non-polarizing beam splitter prism 8, polarizing devices 9 and 10, and photo sensitive devices 11 and 12 in each of the heads $H_1$ to $H_3$ as shown in FIG. 2 in the foregoing encoder are integrally assembled is referred to as a photo sensitive unit. An adjusting mechanism (not shown) is provided so that the polarizing devices 9 and 10 in the photo sensitive unit 100 can rotate in the directions of arrows in the diagrams to the incident light beams, thereby adjusting so as to align the phases of the output signals of the corresponding photo sensitive devices 11 and 12 between the heads $H_1$ and $H_2$ and between the heads $H_2$ and $H_3$.

In the embodiment, for the light beam which enters the photo sensitive unit 100, the two diffracted light beams of the P and S polarization light beams whose polarization planes are deviated by 90° are overlaid and, thereafter, transmitted through the quarter wavelength plate 7, so that the linear polarization light is obtained. The polarizing azimuth of the linear polarization light rotates twice for the period of time when the lattice pattern on the scale 5 moves by one pitch as mentioned above. Therefore, if the polarizing azimuths of the polarizing devices 9 and 10 are changed by rotating the polarizing devices 9 and 10 by using the incident light beams as rotational axes, the phases of the bright and dark periodic signals which are formed by the interference light beams which passed through the polarizing devices 9 and 10 can be adjusted. The phase of the signal from the head $H_2$ is made coincident with the phase of the signal from the head $H_1$ and the phase of the signal from the head $H_3$ is subsequently made coincident with the phase of the signal from the head $H_2$ by using such a rotating mechanism of the polarizing devices 9 and 10 as mentioned above. By repeating such a phase coincidence adjustment, the phases of the output signals from the heads $H_1$ to $H_3$ can be made to coincide.

In the embodiment, the phase adjustments among the heads $H_1$ to $H_3$ for the periodic signals which are detected from the heads $H_1$ to $H_3$ have been executed by the rotation of the polarizing devices 9 and 10. However, as shown in FIGS. 4A to 4D, it is also possible to provide a mechanism to rotate the photo sensitive unit 100 by using the incident light as a rotational axis. In this case, since the phase relation between the photo sensitive devices 11 and 12 is fixed, it is sufficient to match the phases of the output signals among the heads $H_1$ to $H_3$ by paying an attention to either one of the output of the photo sensitive device 11 and the output of the photo sensitive device 12. Thus, the phase adjustment can be more easily executed The adjusting mechanism as mentioned above does not need to be added to all of a plurality of reading heads constructing the encoder For instance, in the case of two reading heads, it is sufficient to provide the adjusting mechanism for at least one of them.

On the other hand, the reading heads used in the embodiments are of the type in which the diffracted light beams caused by the lattice pattern (diffraction grating) on the scale are used. However, in the invention, it is also possible to use ordinary reading heads such that the reflected light or transmitted light from a slit grating is received through a subscale. The invention can be also constructed as a magnetic type encoder using a magnetic scale as a scale, as mentioned above.

In the case of using a laser such as a semiconductor laser as a light source to read as in the foregoing embodiments, there maybe a case where a laser beam having a relatively large intensity which was radiated from the head and which does not read the scale leaks to the outside of the encoder. Therefore, it is necessary to prevent such a leakage of the laser beam to the outside. For this purpose, for instance, a light absorbing member is provided on the optical path of the laser beam and when the laser beam emitted from the head is not irradiated onto the scale, the laser beam is absorbed by the light absorbing member.

In the embodiment, the construction in which a single scale is read by a plurality of reading heads has been shown. However, it is also possible to construct such as to read a plurality of scales by a plurality of reading heads. That is, it is possible to provide encoders of various types on the basis of the concept of the invention and even in any type, the advantages of the invention can be obtained.

As described above, according to the invention, there is provided the summation circuit to add the output signals from the first and second reading means arranged along the moving direction of the scale on which the lattice pattern is formed. Thus, the encoder having a simple construction and a long length measuring stroke can be provided. By providing the adjusting mechanism to adjust the phase difference between the output signals from the first and second reading means, the scale reading operation can be always accurately executed for the whole stroke.

What is claimed is:

1. An encoder comprising:
   first and second scale reading means arranged along a moving direction of a scale, each means generating a signal;
   an adder to add said signals from said first and second reading means;
   a binarizing circuit to binarize an output signal from said adder; and
   a circuit to count a signal from said binarizing circuit.

2. An encoder according to claim 1, wherein said first and second reading means have light sources to irradiate light beams to said scale and photo sensitive devices to receive the light beams modulated by a lattice pattern formed on said scale.

3. An encoder according to claim 1, further having an adjusting mechanism to adjust a phase of at least one of the signals from said first and second reading means.

4. An encoder according to claim 3, wherein said adjusting mechanism is provided for both of the first and second reading means.

5. An encoder comprising:
   a scale formed with a periodic lattice pattern;
   first and second scale reading heads arranged along a moving direction of said scale at a predetermined interval shorter than a length of said scale, said reading heads generating first and second periodic signals, respectively, an adjusting mechanism means including a polarizing device to adjust a phase of at least one of the first and second periodic signals in accordance with a movement of the scale;

an adder to add said at least one adjusted periodic signal and the other of said periodic signals; and a detecting circuit to detect a moving state of the scale on the basis of an output signal of said adder.

6. An encoder according to claim 5, wherein said first and second signals include two signals whose phases are deviated by 90° from each other.

7. An encoder according to claim 6, wherein said adder outputs the two signals whose phases are deviated by 90° from each other, and said detecting circuit detects a movement amount and the moving direction of said scale on the basis of said two signals.

8. An encoder according to claim 5, further having a binarizing circuit to binarize an output signal from said adder and a circuit to count a signal from said binarizing circuit.

9. An encoder according to claim 5, wherein said adjusting mechanism means rotates said polarizing device.

10. An optical type encoder comprising:

optical means for irradiating a light onto a scale having a diffraction grating and for forming an interference light whose polarization plane rotates in response to a displacement of said scale by using a diffraction light of a predetermined order which is caused by said diffraction grating;

photo sensitive means for receiving said interference light through a polarizing device to selectively transfer a polarization light component in a predetermined direction, the displacement of said scale being detected on the basis of an output signal from said photo sensitive means;

a mechanism means for relatively rotating said polarizing device for said interference light in order to adjust a phase of the output signal of the photo sensitive means.

11. An encoder according to claim 10, wherein said mechanism means rotates said polarizing device.

12. An encoder according to claim 11, wherein said mechanism means integrally rotates said polarizing device and said photo sensitive means.

13. An encoder according to claim 10, wherein said interference light is formed by ± primary diffraction light beams.

14. An encoder comprising:

first and second scale reading means arranged along a moving direction of a scale, each means generating a signal;

an adjusting mechanism means including a polarizing device to adjust a phase of at least one of the signals from said first and second reading means; and an adder to add said at least one adjusted signal and the other of said signals.

15. An encoder according to claim 19, wherein said adjusting mechanism means rotates said polarizing device.

* * * * *

UNITED STATES PATENT AND TRADEMARK OFFICE
CERTIFICATE OF CORRECTION

PATENT NO. : 4,998,798
DATED : March 12, 1991
INVENTOR(S) : KOH ISHIZUKA ET AL.

It is certified that error appears in the above-identified patent and that said Letters Patent is hereby corrected as shown below:

COLUMN 1

Line 21, "stroke as" should read --stroke, as--.

COLUMN 7

Line 3, "respectively," should read --respectively;--.

COLUMN 8

Line 30, "claim 19" should read --claim 14--.

Signed and Sealed this

Twenty-third Day of February, 1993

Attest:

STEPHEN G. KUNIN

Attesting Officer

Acting Commissioner of Patents and Trademarks